US010661363B2

(12) United States Patent
Farley, Jr. et al.

(10) Patent No.: US 10,661,363 B2
(45) Date of Patent: May 26, 2020

(54) CABLE SHEARING APPARATUS AND METHOD

(71) Applicant: Absolute Oilfield Equipment, LLC, Tulsa, OK (US)

(72) Inventors: James Shelton Farley, Jr., Oklahoma City, OK (US); James Shelton Farley, III, Oklahoma City, OK (US)

(73) Assignee: Absolute Oilfield Equipment, LLC, Tulsa, OK (US)

( * ) Notice: Subject to any disclaimer, the term of this patent is extended or adjusted under 35 U.S.C. 154(b) by 0 days.

(21) Appl. No.: 15/948,029

(22) Filed: Apr. 9, 2018

(65) Prior Publication Data

US 2019/0308256 A1 Oct. 10, 2019

(51) Int. Cl.
| | | |
|---|---|---|
| *B23D 33/02* | (2006.01) | |
| *B65H 75/02* | (2006.01) | |
| *B23D 15/04* | (2006.01) | |
| *E21B 19/084* | (2006.01) | |
| *B23D 15/00* | (2006.01) | |

(52) U.S. Cl.
CPC .......... *B23D 33/025* (2013.01); *B23D 15/04* (2013.01); *B65H 75/02* (2013.01); *B23D 2015/007* (2013.01); *E21B 19/084* (2013.01)

(58) Field of Classification Search
CPC ................................................ B23D 33/025; B23D 15/04; B23D 2015/007; B65H 75/02; E21B 19/084
USPC ...... 83/54, 157, 623, 861; 30/193, 228, 244, 30/234, 248
See application file for complete search history.

(56) References Cited

U.S. PATENT DOCUMENTS

| | | |
|---|---|---|
| 1,876,954 A | 9/1932 | Johnson |
| 1,935,585 A | 11/1933 | Tornblom |
| 1,972,515 A * | 9/1934 | Eyre ................... B26B 17/02 30/193 |
| 2,247,795 A | 7/1941 | Whitcomb |
| 2,593,993 A | 4/1952 | Dahl et al. |
| 2,660,382 A | 11/1953 | Wilson |
| 2,904,284 A | 9/1959 | Newsom |
| 2,941,746 A | 6/1960 | Hunt |
| 3,010,351 A | 11/1961 | Osborne |
| 3,066,917 A | 12/1962 | Tuplin et al. |
| 3,095,183 A | 6/1963 | Le Bus, Sr. |
| 3,222,057 A | 12/1965 | Couri |
| 3,309,066 A | 3/1967 | Carlson |
| 3,467,360 A | 9/1969 | Mizell |

(Continued)

OTHER PUBLICATIONS

Baker, Ron, A Primer of Oilwell Drilling, Fourth Edition, Petroleum Extension Service, 1979.

(Continued)

*Primary Examiner* — Ghassem Alie
*Assistant Examiner* — Bharat C Patel
(74) *Attorney, Agent, or Firm* — Crowe & Dunlevy, P.C.

(57) ABSTRACT

The invention relates to a cable shearing apparatus and method for effectively cutting a cable from a rotatable drum, such as drilling line, boring line, electrical line, fiber optic line or the like. The cable shearing apparatus includes a cable management assembly having a track assembly and a clamp assembly, and a cable cutting assembly used in conjunction with the cable management assembly to manage, retain and sever a spent portion of the cable upon the drum.

17 Claims, 13 Drawing Sheets

(56) References Cited

U.S. PATENT DOCUMENTS

| | | | | |
|---|---|---|---|---|
| 3,474,533 A * | 10/1969 | Peck | | B23D 15/145 |
| | | | | 30/228 |
| 3,490,128 A | 1/1970 | Giannelli et al. | | |
| 3,710,610 A * | 1/1973 | McCaughey | | H01R 43/045 |
| | | | | 72/409.06 |
| 3,738,614 A | 6/1973 | Peterson | | |
| 3,951,355 A | 4/1976 | Morioka et al. | | |
| 4,026,028 A * | 5/1977 | Green | | B23D 15/14 |
| | | | | 30/233 |
| 4,078,634 A | 3/1978 | Thomas | | |
| 4,103,745 A | 8/1978 | Varich | | |
| 4,227,680 A | 10/1980 | Hrescak | | |
| 4,275,803 A | 6/1981 | Putney | | |
| 4,369,576 A | 1/1983 | McVaugh | | |
| 4,611,787 A | 9/1986 | May | | |
| 4,738,315 A | 4/1988 | Wittrisch | | |
| 4,767,073 A | 8/1988 | Malzacher | | |
| 4,872,384 A * | 10/1989 | Borzym | | B23D 21/00 |
| | | | | 83/454 |
| 4,923,005 A * | 5/1990 | Laky | | E21B 19/22 |
| | | | | 166/335 |
| 5,139,006 A * | 8/1992 | Trudeau | | B28D 1/222 |
| | | | | 125/12 |
| 5,141,085 A | 8/1992 | McCormick | | |
| 5,330,122 A | 7/1994 | Wood | | |
| 5,353,910 A * | 10/1994 | Harris | | B23D 47/042 |
| | | | | 198/345.1 |
| 5,853,118 A | 12/1998 | Avakov | | |
| 6,070,285 A | 6/2000 | Geppert | | |
| 6,182,945 B1 | 2/2001 | Dyer | | |
| 6,189,609 B1 * | 2/2001 | Shaaban | | E21B 19/22 |
| | | | | 166/384 |
| 6,230,955 B1 * | 5/2001 | Parks | | B65G 37/005 |
| | | | | 226/190 |
| 6,349,474 B1 | 2/2002 | Jordan | | |
| 6,357,327 B1 * | 3/2002 | Usui | | B23D 21/003 |
| | | | | 83/300 |
| 6,766,724 B2 * | 7/2004 | Bernardelle | | H02G 1/1256 |
| | | | | 29/33 F |
| 6,886,438 B2 * | 5/2005 | Viviroli | | H01R 43/28 |
| | | | | 81/9.51 |
| 7,134,374 B1 | 11/2006 | Williamson | | |
| 7,210,670 B2 | 5/2007 | Franks | | |
| 7,419,137 B2 | 9/2008 | Boon | | |
| 7,458,170 B1 * | 12/2008 | Richardson | | B65H 61/00 |
| | | | | 33/732 |
| 7,963,319 B2 | 6/2011 | Daigle | | |
| 8,079,569 B2 | 12/2011 | Lesko | | |
| 9,376,294 B2 * | 6/2016 | Fetters, III | | B66D 1/28 |
| 2005/0076513 A1 * | 4/2005 | Brailovskiy | | B25B 7/126 |
| | | | | 30/250 |
| 2007/0119997 A1 | 5/2007 | Boon | | |
| 2007/0204470 A1 * | 9/2007 | Lai | | B26B 17/00 |
| | | | | 30/244 |
| 2009/0038165 A1 * | 2/2009 | Lai | | B26B 17/00 |
| | | | | 30/287 |
| 2011/0037040 A1 | 2/2011 | Hess | | |
| 2011/0147008 A1 | 6/2011 | Brown | | |
| 2017/0355027 A1 * | 12/2017 | D-Antuono | | B25B 27/10 |

OTHER PUBLICATIONS

Coiled Tubing Technical Advances Cut Operational Costs Sharply, Drilling Contractor, Jul./Aug. 2005.

* cited by examiner

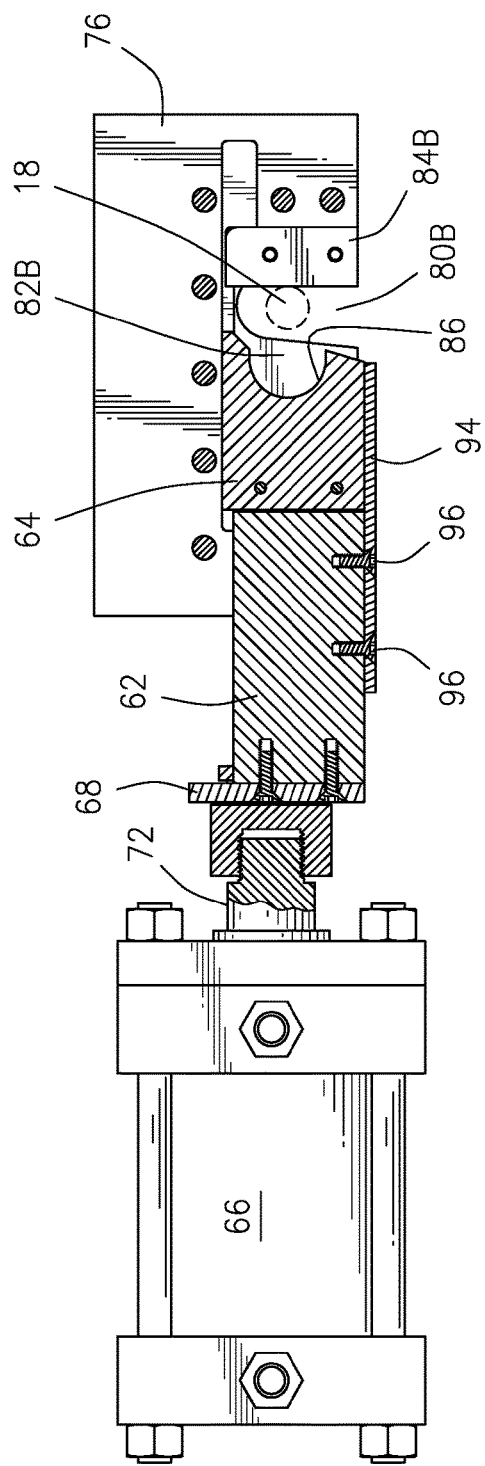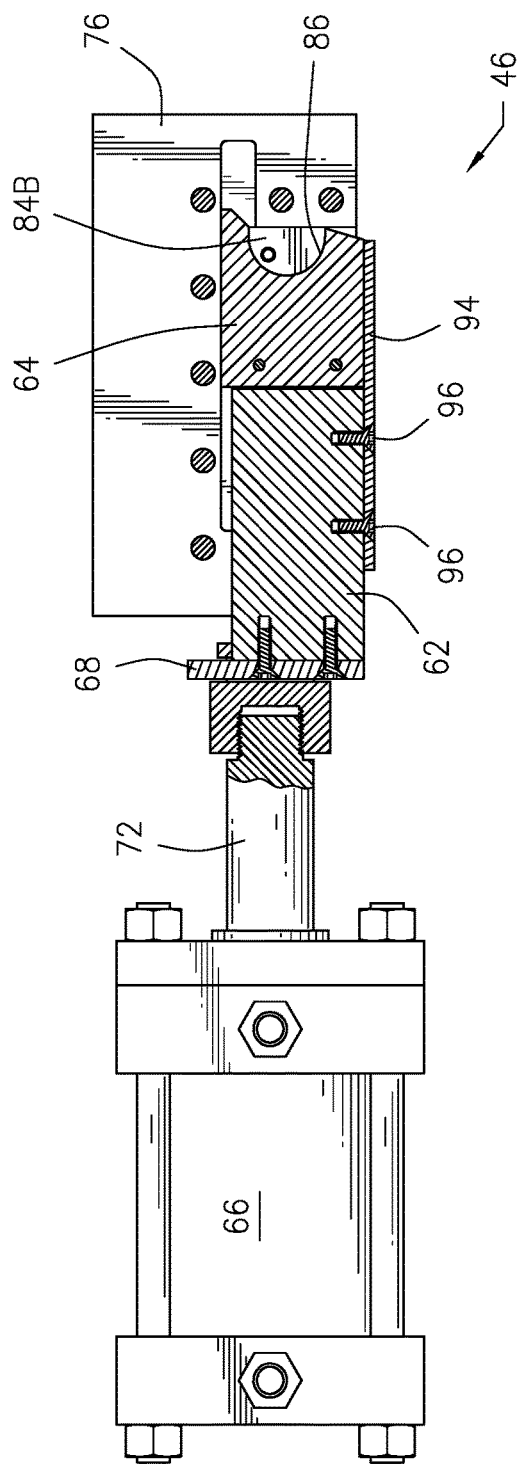
FIG. 8A
FIG. 8B

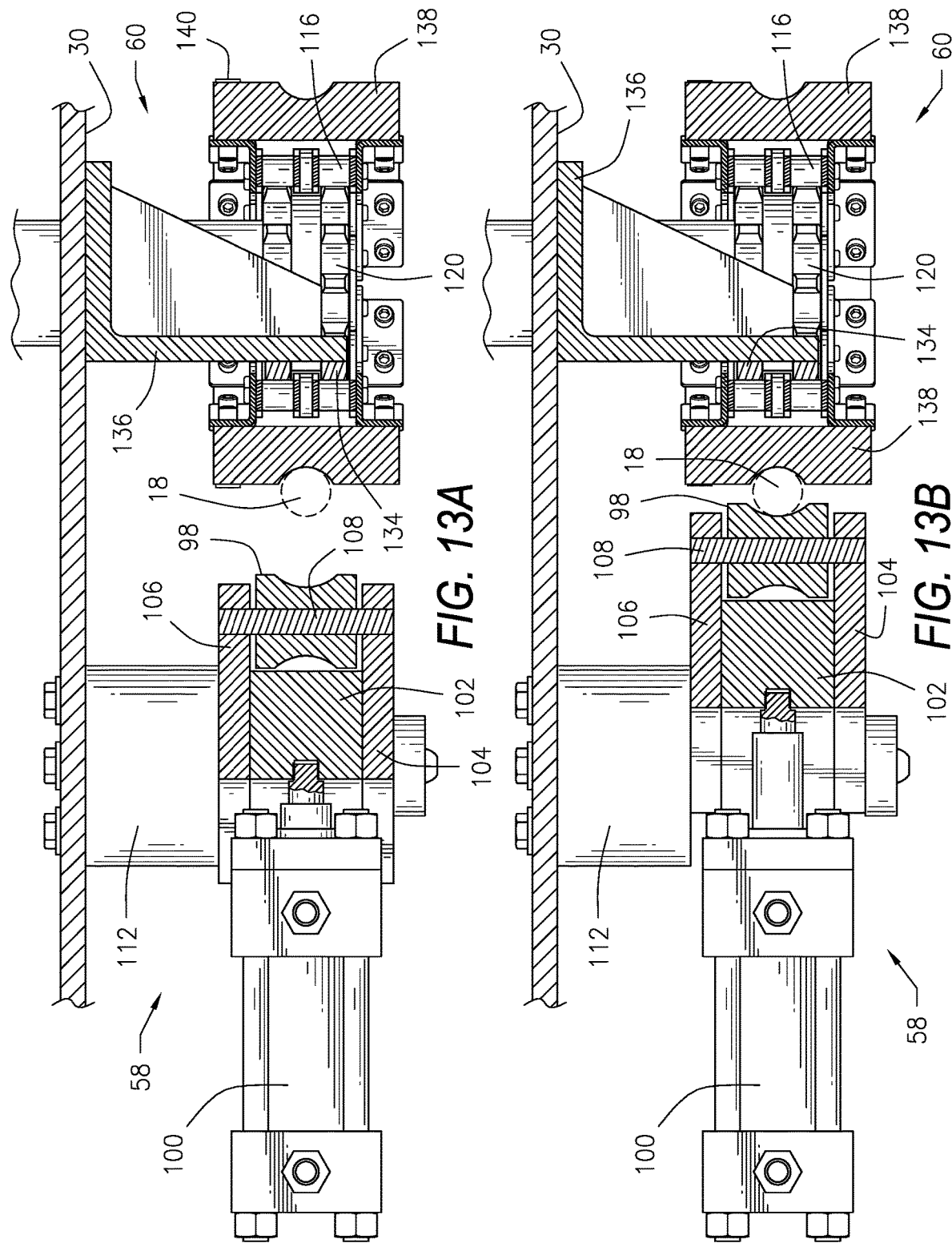

CABLE SHEARING APPARATUS AND METHOD

BACKGROUND OF THE INVENTION

1. Field of the Invention

This invention relates generally to a cable shearing apparatus and method, and more particularly to a cable shearing apparatus attachable adjacent to a rotatable drum and having a cable management assembly and a cable cutting assembly used in conjunction to manage, retain and sever a spent portion of cable upon the drum.

2. Description of the Related Art

The major components of a drilling rig hoisting system consists of a mast or derrick, a crown block, a traveling block, wire rope and a drawworks. The drawworks is used to lift or lower the drill pipe assembly into or out of the hole being drilled. The drawworks is essentially a large winch, having a drum to spool (wrap) or unwrap wire rope for the purpose of lifting or lowering the drill pipe assembly. Thus, the drum is able to rotate in either direction and is controlled and powered by a drive motor.

The wire rope is supplied to the drilling site on a large spool and is typically 0.5-to-2 inches in diameter. Initially, in setting-up the drilling rig, the wire rope is pulled from the supply reel through the deadline anchor and then sequentially threaded through the sheaves in the crown block and traveling block to achieve the number of lines required to support the drilling assembly planned for the wellbore. When the wire rope end has been strung over the final crown block sheave, this wire rope end is pulled down to the drawworks drum at the rig floor where it is threaded into the dog knot hole and clamped. Then the drum is rotated to pull the wire rope through this system of sheaves in order to wind-up several layers of wire rope onto the drum. The wire rope is unspooled from the supply reel. Finally, the deadline anchor is tightened, which holds the wire rope fixed at that end and then the traveling block can be raised or lowered by the rotation of the drawworks drum. The wire rope is never cut between the supply reel and the deadline anchor.

During the drilling of the wellbore, the traveling block moves up and down many times while lifting large loads (can be 250-tons or more). The wire rope bends around the sheaves and is spooled onto the drum under load many times, which causes wear. The rig crew monitors this wear using an instrument that tracks the ton-miles of use for this section of wire rope from the supply reel. When a threshold number of ton-miles has been reached (set by their cut-and-slip program for wire rope maintenance), the used section of wire rope must be retired from service.

To perform the wire rope cut and slip, the traveling block is suspended by a "hang-line" and the deadline anchor clamp is loosened. Then a predetermined number of feet of wire rope is spooled onto the drawworks drum, thereby pulling fresh unused wire rope from the supply reel and into the system of sheaves. The place where the spent wire rope is to be cut is bound with tape and cut with either a manual or hydraulic cutting tool. This is done on the rig floor. The spent wire rope is removed from the drum and rig floor and the new wire rope end is threaded through the dog knot hole and clamped. Then the drum is rotated to spool several layers of wire rope, before the deadline anchor is re-clamped. Finally, the crown block hang-line is removed and drilling can resume.

It is therefore desirable to provide an improved cable shearing apparatus and method for cut and slip operations on an oil drilling rig.

It is further desirable to provide a cable shearing apparatus configured to be mounted adjacent to the rotating drum in order manage, retain and sever a spent portion of cable upon the drum.

It is further desirable to provide a cable shearing apparatus configured to be mounted to a drawworks housing (or rig floor) to safely and quickly move the wire rope through the crown and traveling block sheave system, clamp and cut the wire rope and control the wire rope movement and pull tension on the wire rope when spooling the drum.

It is yet further desirable to provide a cable shearing apparatus having a cable management assembly and a cable cutting assembly for maintenance and operation in a secure and safer manner.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

BRIEF SUMMARY OF THE INVENTION

In general, the invention relates to an improved cable shearing apparatus. The cable shearing apparatus includes a cable management assembly configured to engage an extended span of a cable and a cable cutting assembly configured to sever the cable.

The cable management assembly includes a continuous track assembly and a clamping assembly positioned on opposing sides of the cable. The cable management assembly also includes a clamping actuator (e.g., a hydraulically-powered, linear actuator) configured to laterally move the clamping assembly towards and/or away from the track assembly. The clamping assembly has a plurality of guide rollers. The track assembly has a drive chain engaged with drive sprockets, and has a motor (e.g., a hydraulically-powered, motor) having a drive shaft engaged with one of the drive sprockets. The drive chain can be a double link drive chain having a plurality of blocks having a generally U-shaped channel. The blocks can be constructed from rubber, brass, bronze or other suitable material. In addition, a chain guide or tensioner can be engaged with the track assembly. The chain guide can have a pair of parallel guide rails mounted to a chain guide support, with the guide rails engaged with the drive chain.

The cable cutting assembly includes a cutter arm having a changeable blade body, and also includes a cutter actuator (e.g., a hydraulically-powered, linear actuator) engaged with the cutter arm. The cutter arm has a terminal channel for receipt of the blade body. An upper support block and a lower support block each have a cutter arm channel, and the cutter arm is slidably mounted in the cutter arm channel. Additionally, a terminal end of the cutter arm channel has a pair of spaced cutter anvil inserts that are configured to work in conjunction with the blade body to completely sever the cable. A cutter arm pin guide assembly has a pair of pins configured to be received in a pin guide channel of the cutter arm in order to guide the lateral movement of the cutter arm through the cutter arm channels. In addition, the cable cutting assembly can include a cover plate attached to the cutter arm to shield the blade body.

The cable shearing apparatus may also include at least one cable length gauge in communication with a cable length sensor. The cable length sensor is configured to measure a length of the cable that passes through the cable management assembly.

The cable shearing apparatus can also include a gantry assembly configured to allow for lateral and/or longitudinal movement of the apparatus. Moreover, a cable brake assembly can be utilized to hold the cable in the apparatus. The cable brake assembly can include a vise having a handle with movable jaws. Further, a lower guide roller can be positioned to aid in aligning and positioning the cable in the cable management assembly.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 8A is a top, partial cross-section view along line 8-8 of FIG. 5 with the cable cutting assembly shown in a retracted position;

FIG. 8B is a top, partial cross-section view along line 8-8 of FIG. 5 with the cable cutting assembly shown in an extended position;

FIG. 13A is a top, partial cross-section view along line 13-13 of FIG. 5 with the cable management assembly shown in a retracted position; and FIG. 13B is a top, partial cross-section view along line 13-13 of FIG. 5 with the cable management assembly shown in an engaged position.

DETAILED DESCRIPTION OF THE INVENTION

Figure 1:
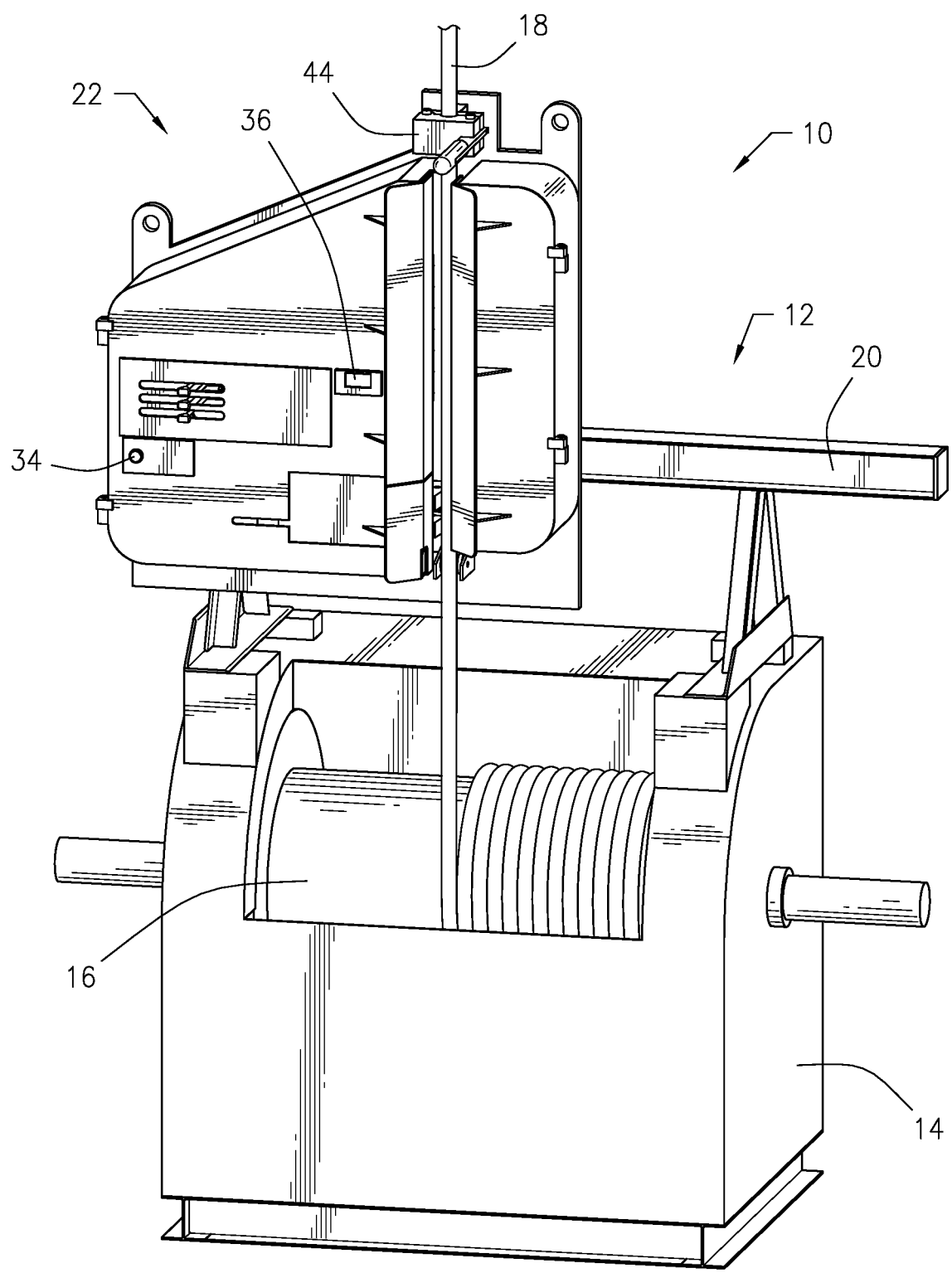
FIG. 1 is a perspective view of an example of a movable housing attached to a drawworks in accordance with an illustrative embodiment of the cable shearing apparatus and method disclosed herein.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

The invention relates to a cable shearing apparatus and method, which is attachable adjacent to a rotatable drum. The apparatus includes a cable management assembly and a cable cutting assembly used in conjunction to manage, retain and sever a spent portion of cable upon the drum. The apparatus can be directly controlled using levers or can be remotely controlled using a wired or wireless control system that allows the operator to be stationed in front of the drum, thereby reducing the risk of injury to personnel. For purposes of exemplification and not limitation, the drum is discussed and illustrated in the figures of the drawings as a drawworks mounted to a floor in an oil field drilling rig. In addition to drilling line, the cable shearing apparatus and method can be used with line boring, electrical wire and cable, fiber optic cable or the like. The apparatus and method disclosed herein are capable of pulling approximately 2,000 pounds (approximately 907 kg) at a rate of about 1 foot of cable per second, and provides an immediate and safe assembly to retain a cable wound upon the drum, a separate assembly for shearing the cable at a specific location upon the cable, and an assembly for managing the cable during periodic maintenance.

Referring now to the figures of the drawings, wherein like numerals of reference designate like elements throughout the several views, and initially to FIG. 1, the cable shearing apparatus 10 can be attached to a gantry assembly 12 to allow lateral and/or longitudinal movement of the apparatus 10 in order for the cable 18 to spool and de-spool as intended during operation of the drum 16, such as during drilling operations. The gantry assembly 12 is attached to an outer housing 14 of the drum 16 at a position that does not impede the operation of the drum 16. The gantry assembly 12 may include a lateral guide assembly 20 and/or a longitudinal guide assembly (not shown) for supporting a movable housing 22 that encloses the components of the cable shearing apparatus 10. The movable housing 22 may be mounted to the gantry assembly 12 such that it is movable between a parked position and an operational position. Although the lateral guide assembly 20 of the gantry assembly 12 is illustrated as a track of I-beam, a person having skill in the art will appreciate that the gantry assembly 12 can be constructed otherwise in order to provide the necessary stability to the apparatus 10. For example, the lateral guide assembly 20 and/or the longitudinal guide assembly may be constructed using square tubing, rounded tubing or other type of beam or track that provides a smooth pathway upon which the movable housing 22 traverses. In addition, the gantry assembly 12 can include a motor, a powered actuator or motor, and/or a transmission (not shown) for powered movement of the movable housing 22 as necessary during operation of the apparatus 10.

Figure 2:
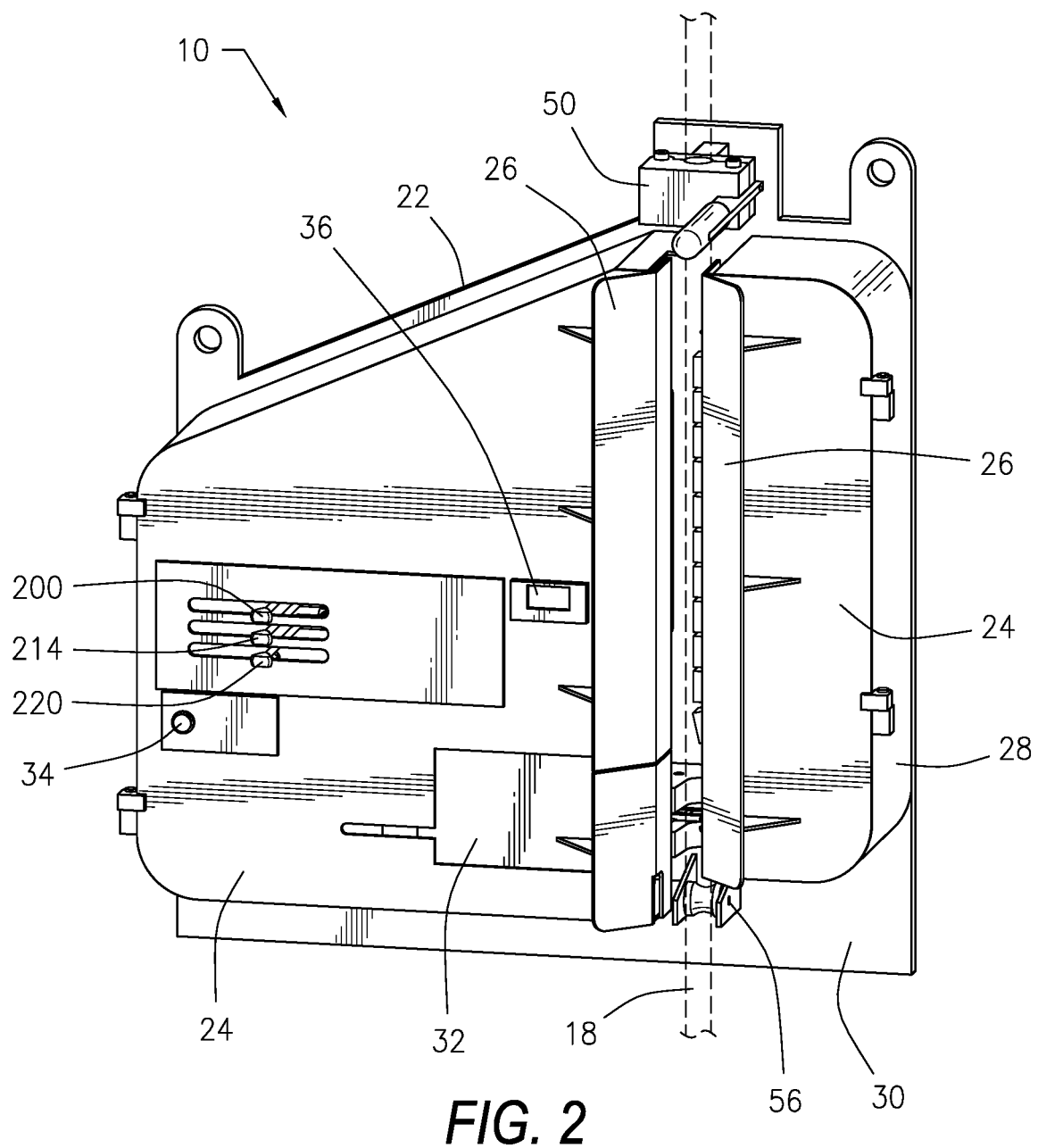
FIG. 2 is a perspective view of the movable housing shown in FIG. 1.

The movable housing 22 can include a set of doors 24 for enclosing and providing selective access to a cable management assembly 42, a cable cutting assembly 46, and other components of the cable shearing apparatus 10. As illustrated, the doors 24 include handles 26, and the doors 24 are hingedly attached to a movable housing sidewall 28. The housing sidewall 28 is connected to a movable housing support plate 30, which is in turn can be attached to the gantry assembly 12. As exemplified in FIGS. 2 and 4, one of the doors 24 can include a cutting assembly access panel 32 that is slidable between an open position and a closed position. In addition, one of the doors 24 can include an on/off power button 34 and a cable length display 36.

Figure 3:
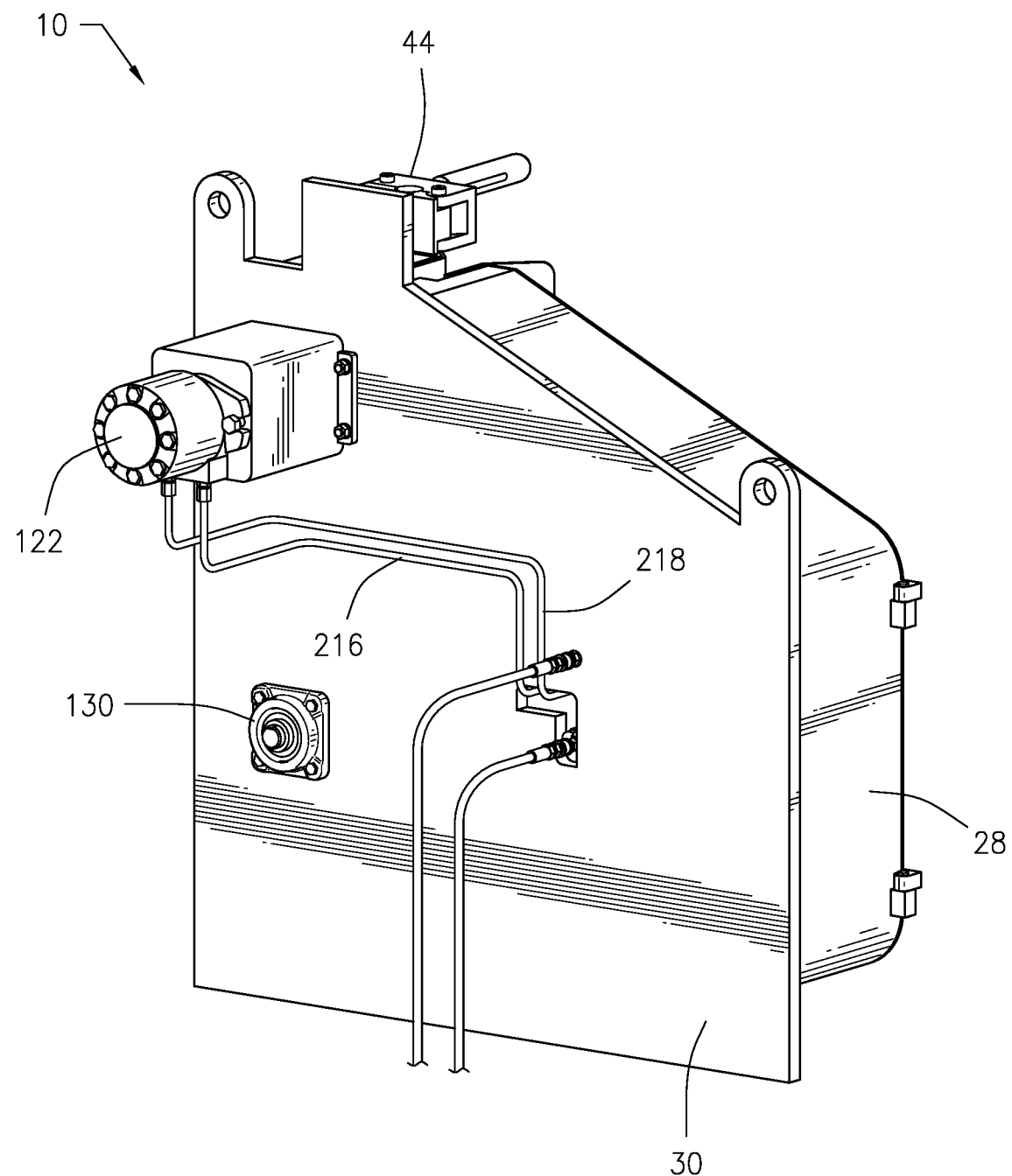
FIG. 3 is a perspective view of the movable housing shown in FIGS. 1 and 2 with the safety doors opened.
Figure 4:
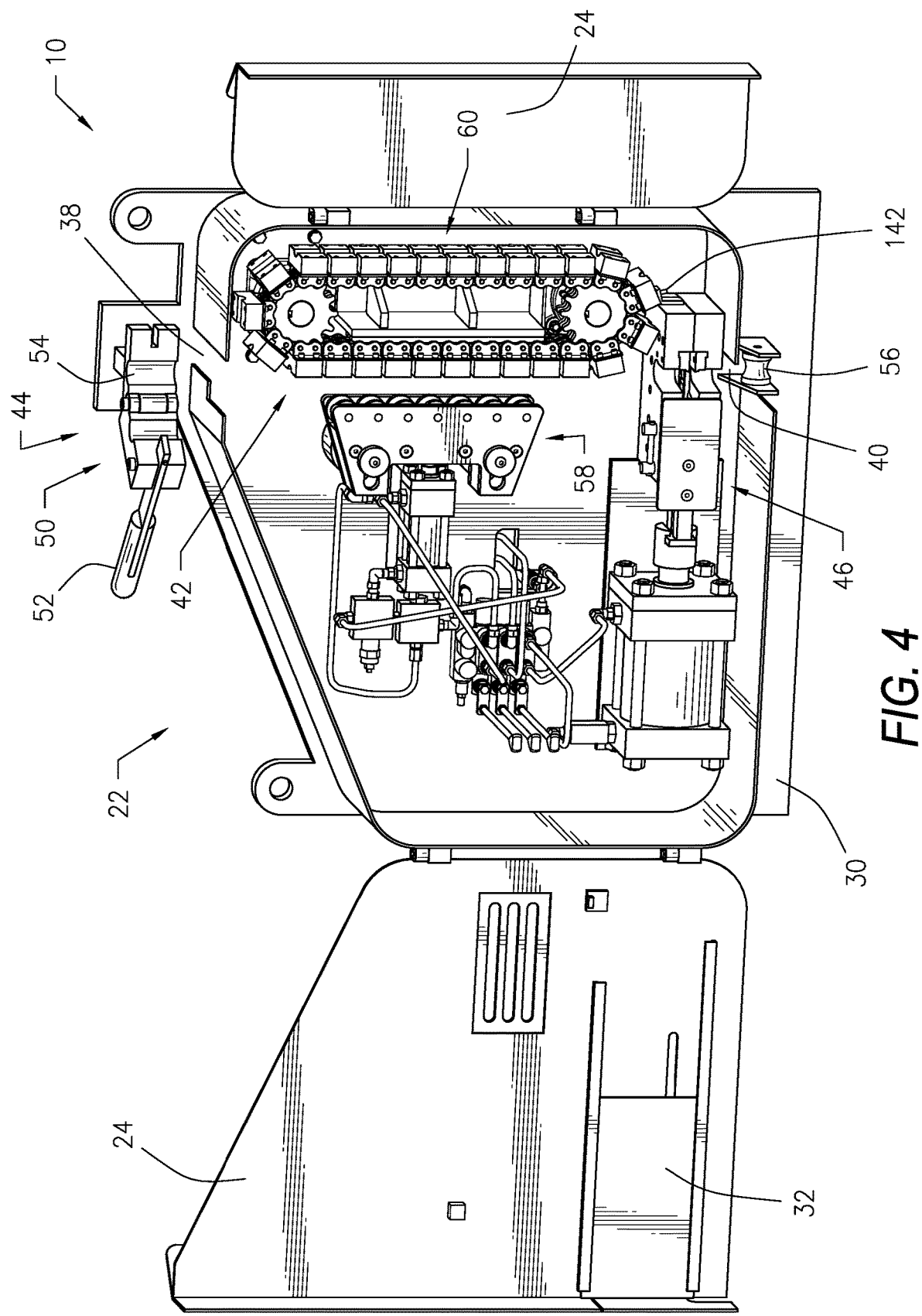
FIG. 4 is a rear perspective view of the movable housing shown in FIGS. 1 and 2.
Figure 5:
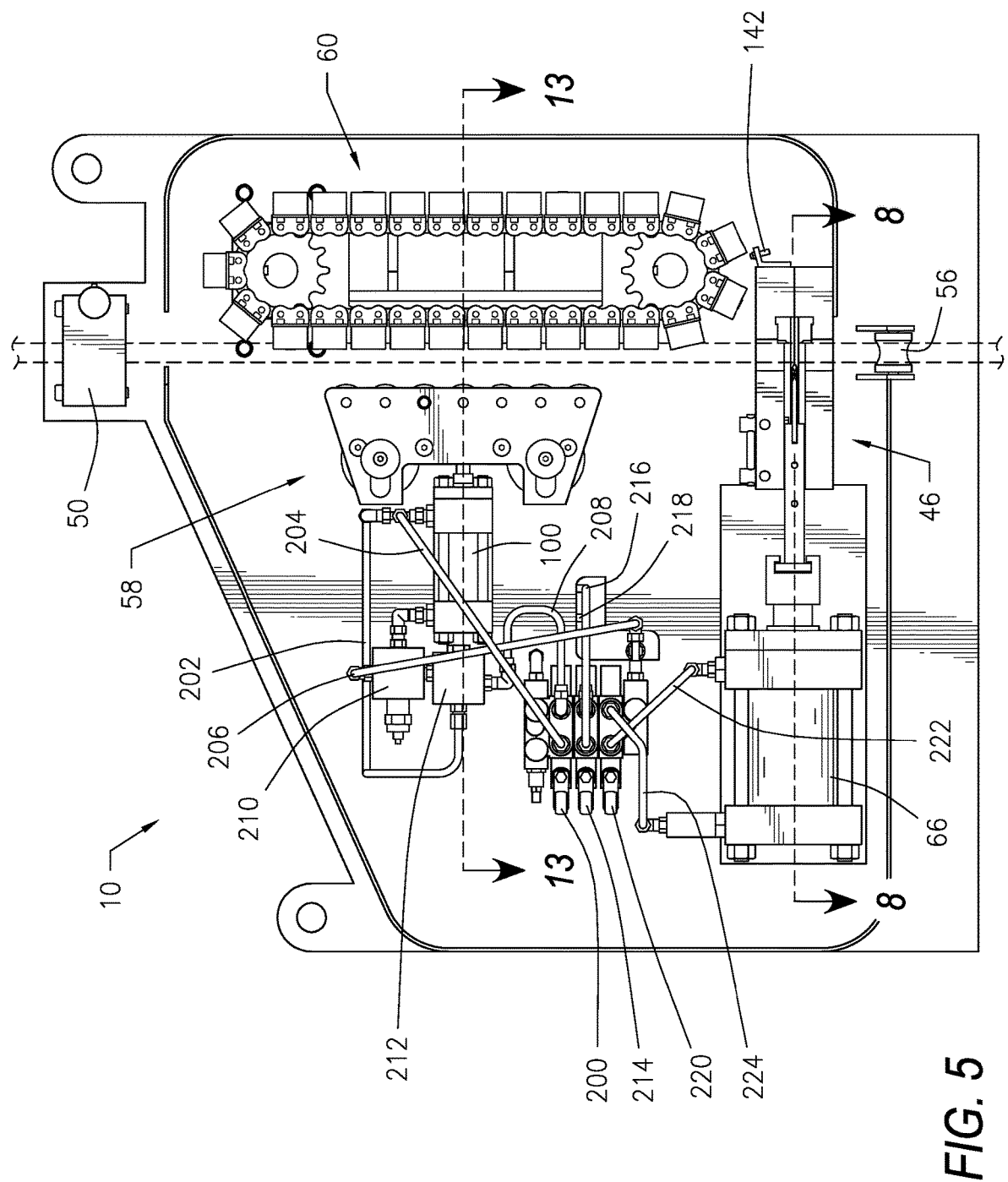
FIG. 5 is a front elevation view of an example of a cable shearing apparatus in accordance with an illustrative embodiment of the invention disclosed herein.

Turning now to FIGS. 3 through 5, the cable shearing apparatus 10 may include a cable brake assembly 44 that is attached to the housing support plate 30 adjacent to an upper opening 38 in the housing sidewall 28. As illustrated, the cable brake assembly 44 includes a vise 50 having a handle 52 with movable jaws 54 that are configured to hold the cable 18 firmly in place while the apparatus 10 is in operation. The movable jaws 54 of the vise 50 may be made of metal for use with wire rope on an oil rig, or can be constructed of a softer material, such as a resilient rubber, plastic or any other natural or unnatural material (e.g., nylon, polyethylene, etc.), for use with different types of cable 18. The vise 50 can be manually operated as illustrated, or alternatively, can be powered by a motor, actuator or the like (not shown). A person having skill in the art will appreciate that the apparatus 10 may utilize other constructions of the cable brake assembly 44.

In addition, a lower guide roller 56 can be attached to the housing support plate 30 adjacent to a lower opening 40 in the housing sidewall 28. The guide roller 56 can be a cylindrical roller, a wedge roller or the like that aid in aligning and positioning the cable 18 in the cable management assembly 42.

Figure 6:
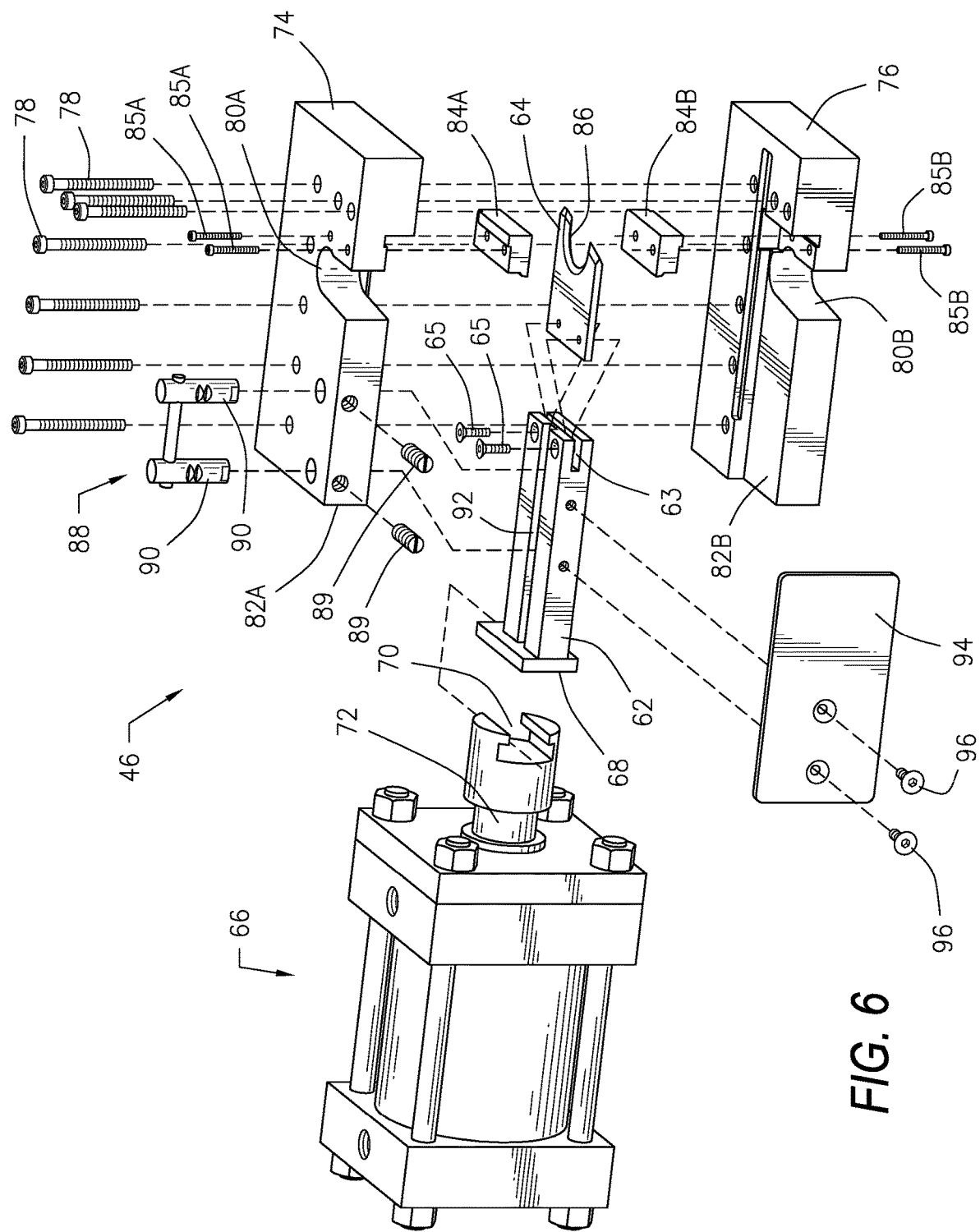
FIG. 6 is an exploded perspective view of an example of a cable cutting assembly in accordance with an illustrative embodiment of the invention disclosed herein.
Figure 7:
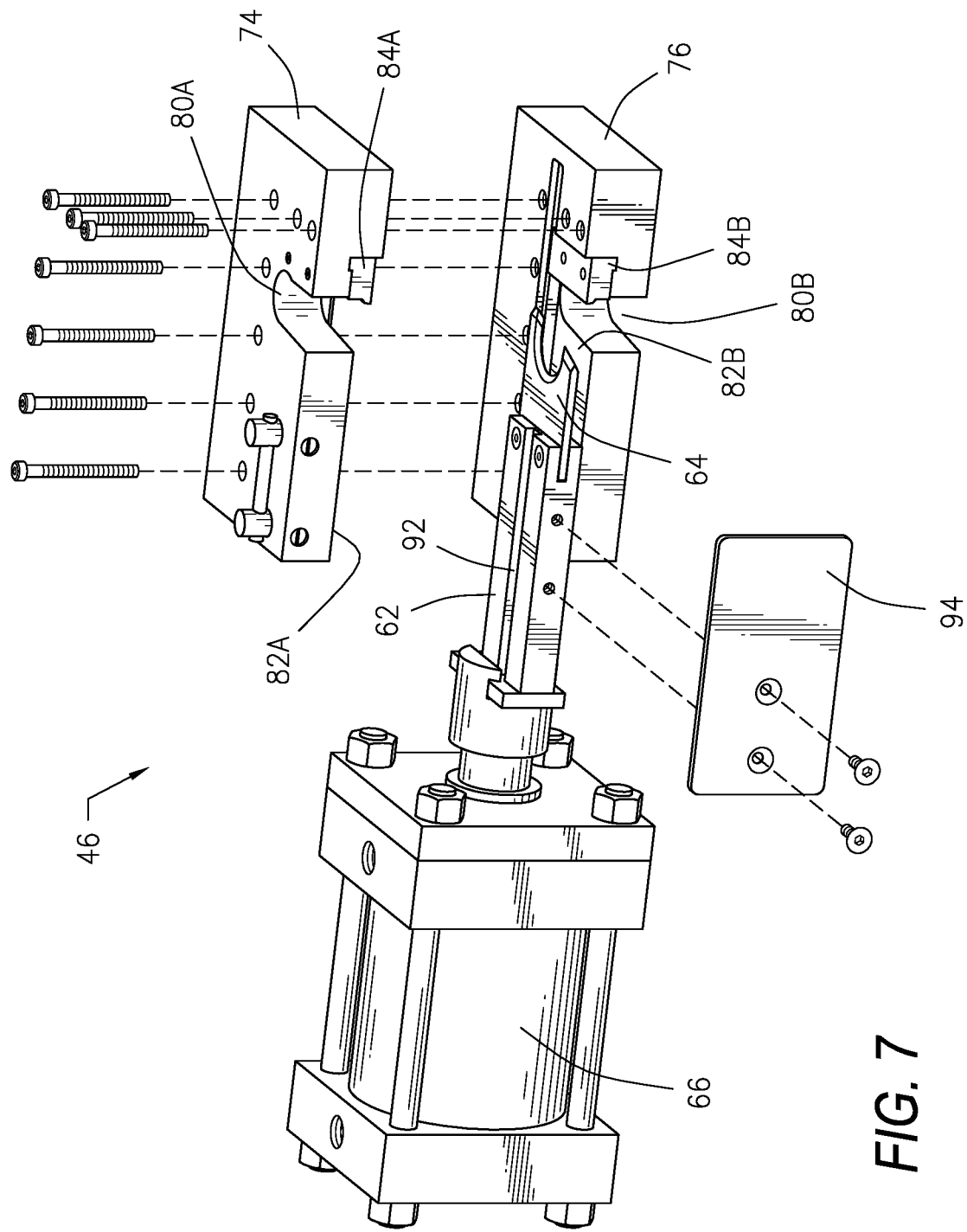
FIG. 7 is another exploded perspective view of the cable cutting assembly shown in FIG. 6.

Referring now to FIGS. 6 through 8, the cable cutting assembly 46 includes a cutter arm 62 having a changeable blade body 64 and a cutter actuator 66. The cutter arm 62 includes a terminal channel 63 for receipt of the blade body 64, which is secured thereto using fasteners 65. The cutter arm 62 has a ram collar key 68 configured to engage a ram collar 70 attached to a terminal end of an arm 72 of the powered actuator 66. The cutter arm 62 is slidably mounted between an upper support block 74 and a lower support block 76. The upper support block 74 and the lower support block 76 are connected together using a plurality of fasteners 78. The upper support block 74 and the lower support block 76 can be symmetrical with each having a cable channel 80A and 80B, which are aligned and configured for receipt of the cable 18. The upper support block 74 and the lower support block 76 also each include a cutter arm channel 82A and 82B with the cutter arm 62 slidably mounted therein.

Cutter anvil inserts 84A and 84B are respectively attached using fasteners 85A and 85B to the upper support block 74 and the lower support block 76 at a terminal end of the cutter arm channel 82A and 82B. As illustrated in FIGS. 8A and 8B, the cutter anvil inserts 84A and 84B and the blade body 64 are configured to work in conjunction to sever the cable 18. The blade body 64 includes a formed notch 86 for receipt of the cable 18, and the blade body 64 passes between the opposing cutter anvil inserts 84A and 84B in order to completely sever the entire diameter of cable 18 at a selected point.

In addition, a cutter arm pin guide assembly 88 is adjustably secured within the upper support block 74 using fasteners 89. The cutter arm pin guide assembly 88 can include a pair of pins 90 that pass through the upper support block 74 and are received in a pin guide channel 92 of the cutter arm 62 in order to guide the lateral movement of the cutter arm 62 during operation. Moreover, the cable cutting assembly 46 can include a cover plate 94 that is attached to the cutter arm 62 using fasteners 96, and the plate 94 is configured to shield the blade body 64 during operation.

The cable cutting assembly 46 is mounted to the movable housing support plate 48 intermediate of the cable management assembly 42 and the lower guide roller 56. With the cable 18 being engaged on the drum side of the apparatus 10 by the cable management assembly 42 and held on the rig side of the apparatus 10 by the cable brake assembly 44, the cable 18 may be securely severed and the worn cable 18 wrapped about the drum 14 can be replaced.

The cable management assembly 42 includes a clamping assembly 58 and a continuous track assembly 60 that are positioned on opposing sides of the cable 18. The clamping assembly 58 and the continuous track assembly 60 engage and move the cable 18 so that the cutting assembly 46 can sever the cable 18 at a predetermined location. The clamping assembly 58 and the continuous track assembly 60 cradle approximately one-third of each side of the cable 18 along an extended span of the cable 18. The clamping assembly 58 and the continuous track assembly 60 engage the cable 18 from two opposing sides and are capable of pulling up or down with about 2,000 pounds of force at a rate of about 1-foot per second.

Figure 9:
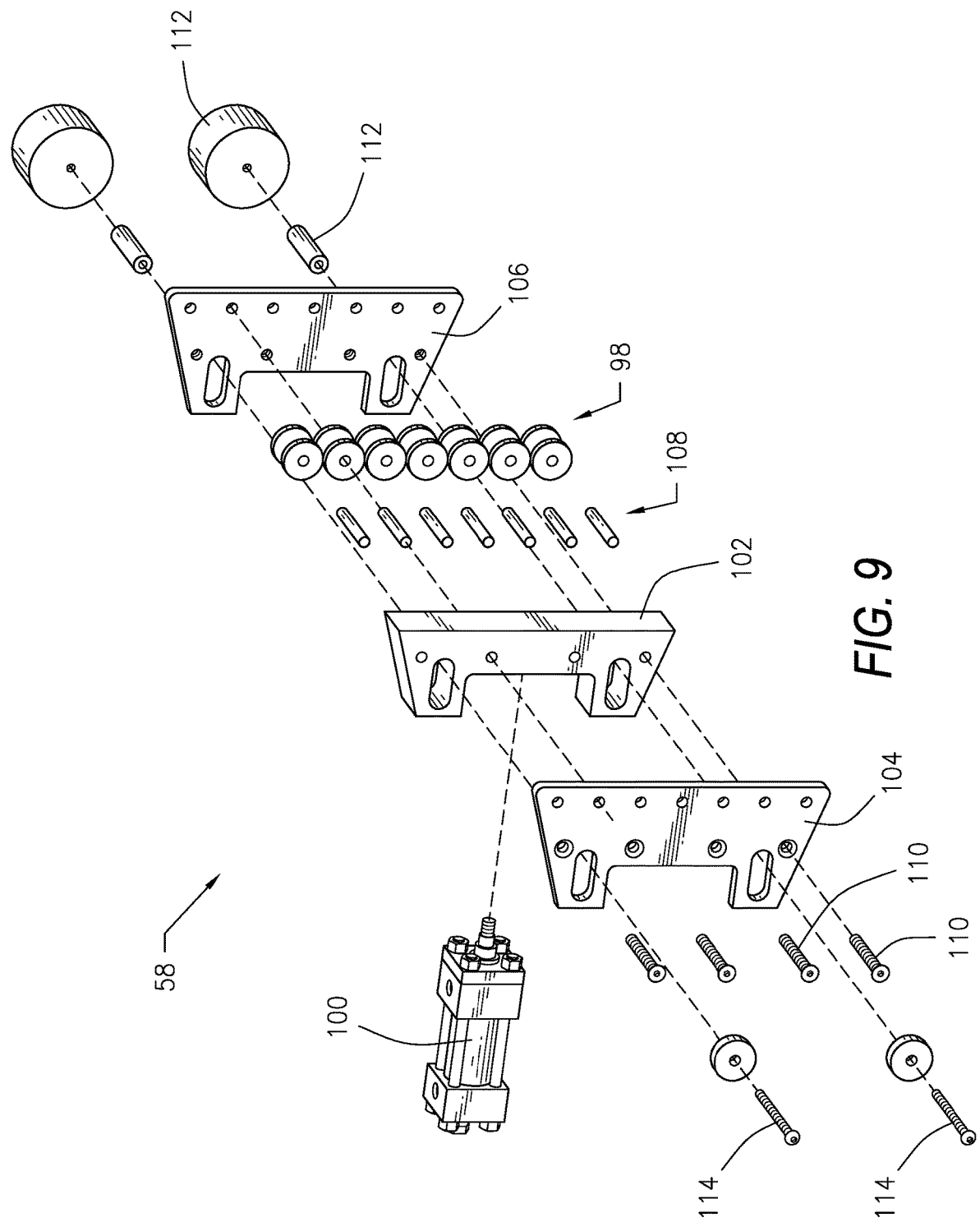
FIG. 9 is an exploded view of an example of a clamping assembly of the cable management assembly in accordance with an illustrative embodiment of the invention disclosed herein.
Figure 10:
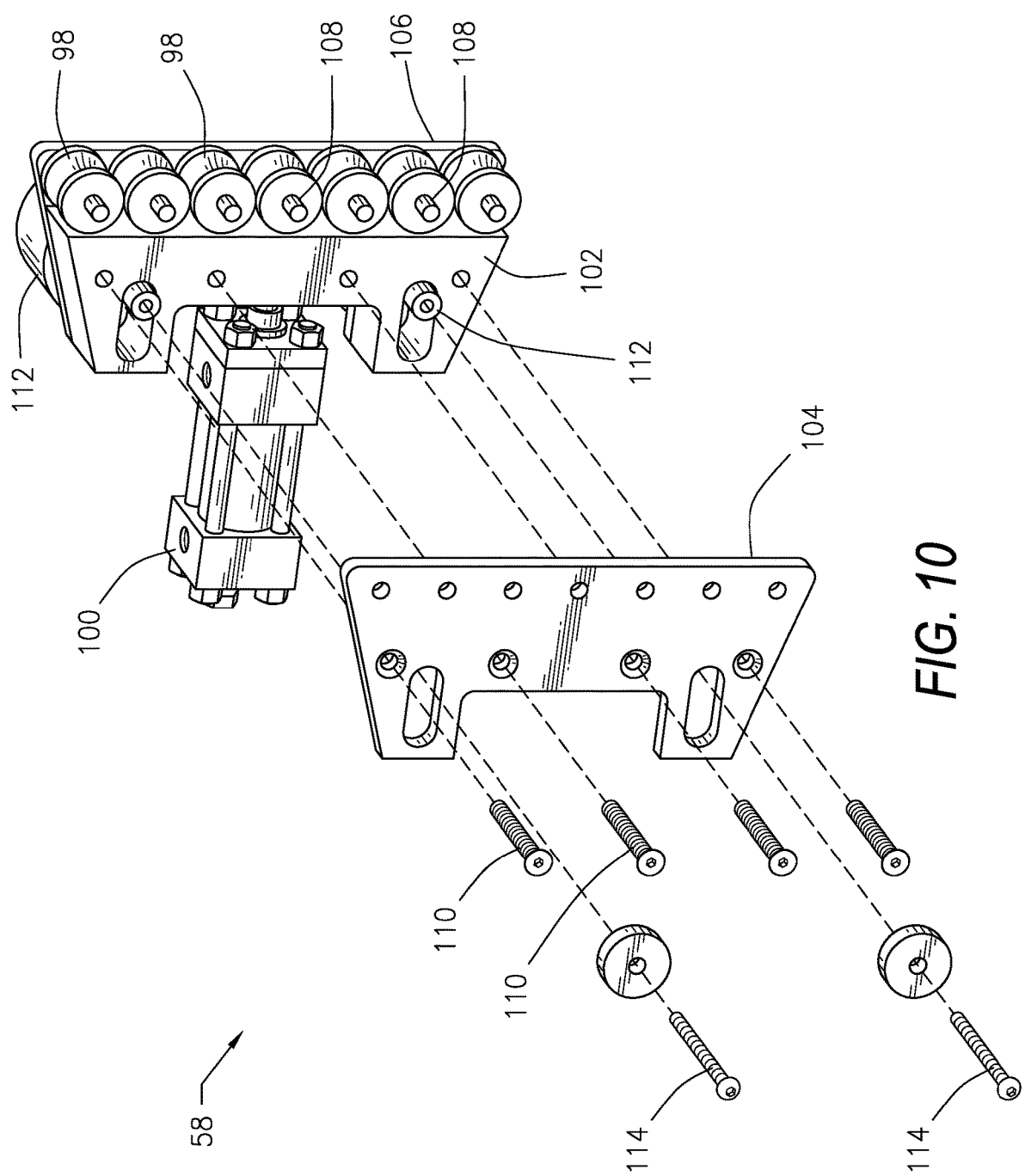
FIG. 10 is another exploded view of the clamping assembly shown in FIG. 9.

Referring now to FIGS. 9 and 10, the clamping assembly 58 has a plurality of unpowered, guide rollers 98. A clamping actuator 100 is mounted to the support plate 30 and is configured to laterally move the clamping assembly 58 towards and away from the track assembly 60. The guide rollers 98 and a corresponding plurality of axles 108 are journaled intermediate of a guide roller support 102 having a front plate 104 and a rear plate 106. The guide roller support 102, the front plate 104 and the rear plate 106 are joined together using fasteners 110. The clamping assembly 58 may be spaced from the support plate 30 using spacers 112 and fasteners 114.

Figure 11:
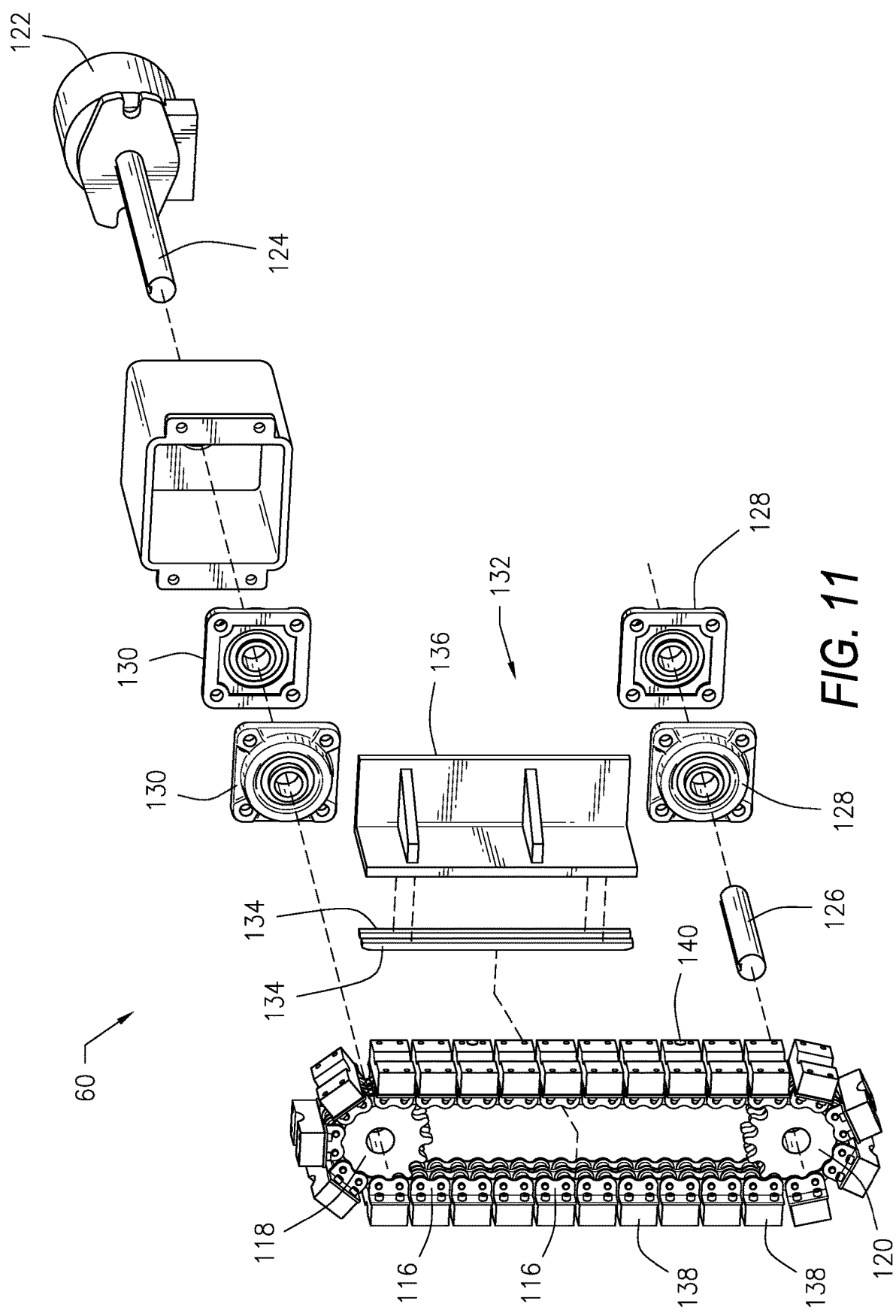
FIG. 11 is an exploded view of a continuous track assembly of the cable management assembly in accordance with an illustrative embodiment of the invention disclosed herein.
Figure 12:
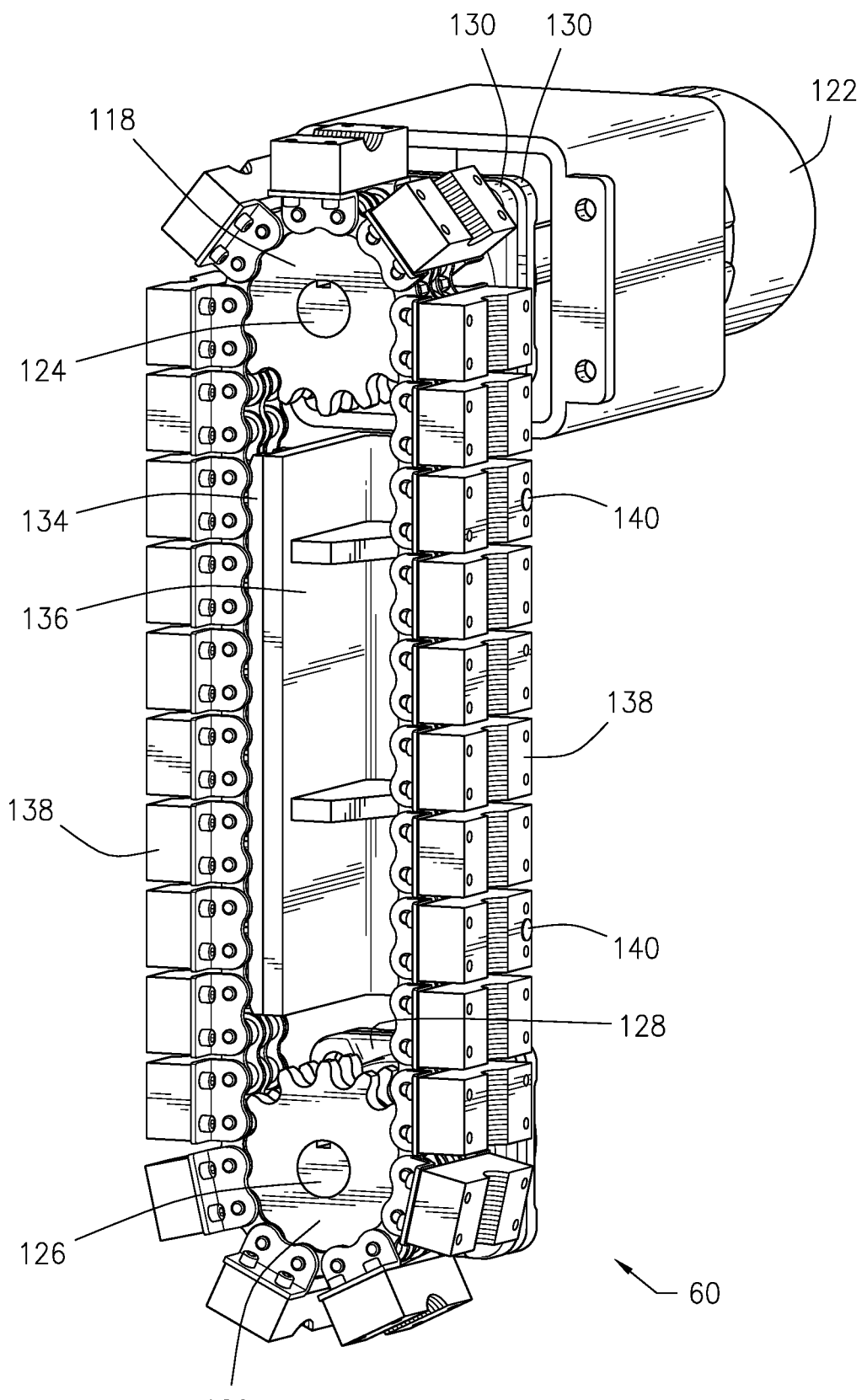
FIG. 12 is a perspective view of the continuous track assembly shown in FIG. 11.

FIGS. 11 and 12 illustrate the track assembly 60 having a drive chain 116 engaged with an upper drive sprocket 118 and a lower drive sprocket 120. A motor 122 with a drive shaft 124 power the upper drive sprocket 118 (as shown) or the lower drive sprocket 120. The drive shaft 124 of the motor 122 is journaled in a bearing 130, such as a flange or pillow block bearings, that is mounted to the movable housing support plate 48. The lower drive sprocket 120 is coupled to a drive shaft 126, and similar to the drive shaft 124, the drive shaft 126 is journaled in a bearing 128, such as a flange or pillow block bearings, which is mounted to the movable housing support plate 48 in a parallel, spaced relation. The rotation of the upper drive sprocket 118 is transmitted to the lower drive sprocket 120 and powers the rotation of the drive chain 116. A person having skill in the art will appreciate that the lower drive sprocket 120 could be separately powered by a motor.

As exemplified in the drawings, the drive chain 116 is a double link drive chain engaged with the upper drive sprocket 118 and the lower drive sprocket 120. The drive chain 116 has a plurality of U-blocks 138 that engage the cable 16. The U-blocks 138 are shown in the drawings as brass or bronze U-blocks 138 for use with drilling line; however, the apparatus 10 may utilize other types, styles and forms of blocks, such as rubber blocks, if the cable is an electrical line or fiber optic cable. One or more cable length gauges 140 can be attached to the drive chain 116 and in communication with a cable length sensor 142. The cable length sensor 142 is electrically coupled to the cable length display 36 in order to accurately measure and display the length of cable 18 that passes through the cable management assembly 42.

In addition, the track assembly 60 can include a chain guide or tensioner 132 that engages the drive chain 116. As illustrated, the chain guide 132 includes a pair of parallel guide rails 134 mounted to a chain guide support 136, and the guide rails 134 are respectively engaged with a pin of the of the double link drive chain 116. The chain guide support 136 is attached to the movable housing support plate 48.

As discussed above, the cable shearing apparatus 10 includes the clamping actuator 100 that moves the clamping assembly 58 in relation to the track assembly 60 in order to provide force against the cable 18 for secure clamping. The cable shearing apparatus 10 also includes the cutter actuator 66 that moves the cutter arm 62 in relation to the cutter anvil inserts 84A and 84B in order to completely sever the entire diameter of cable 18 at a selected point. The clamping actuator 100 and the cutter actuator 66 are both hydraulically-operated, linear actuators that are in fluid communication with a hydraulic fluid reservoir (not shown). One skilled in the art will appreciate that the cable shearing apparatus 10 and method can also be used with pneumatically or electrically powered actuators.

A method for using the cable shearing apparatus 10 is also contemplated within the scope of this disclosure. During operation, the movable housing 22 can be moved from a parked position to an operational position along the gantry assembly 12. The cable 18 is feed through the cable management assembly 42 and engages the lower guide rollers 56 and/or the brake assembly 44. As shown in FIGS. 5, 13A and 13B, a cable clamp handle 200 can be triggered in order to activate the clamping actuator 100 in order to selectively engage and retract the clamping assembly 58 with the cable 18. In order to engage the clamping assembly 58, hydraulic fluid flows from the reservoir through conduit 202 to move the clamping actuator 100 towards the track assembly 60. Conduits 206 and 208 are in fluid communication with bleed valves 210 and 212 in order to regulate the hydraulic pressure within the clamping actuator 100.

Then, a cable track handle 214 can be triggered in order to advance and reverse the cable 18 through the cable management assembly 42 to the desired shearing point. In order to advance the track assembly 60, hydraulic fluid flows from the fluid reservoir through conduit 216 to the motor 122 to rotate the upper drive sprocket 118, and to reverse the cable 18 through the cable management assembly 42, hydraulic fluid flows from the motor 122 through conduit 218 back to the reservoir.

Once the cable 18 is securely retained by the cable management assembly 42, a cable shear handle 220 can be actuated in order to advance the cutting assembly 46 to sever the cable 18 at the desired location. In order to advance the cutter actuator 66, hydraulic fluid flows from the fluid reservoir through conduit 222, and to retract the cutter arm 62, hydraulic fluid flows from cutter actuator 66 through conduit 224 back to the reservoir.

The spent portion of cable 18 on the drum side of the apparatus 10 may then be removed from the drum 14, and the spent portion of cable 18 can be disposed of and a new portion of cable 18 can be spliced in using techniques readily known to those having skill in the art. Subsequently, the track assembly 60 advances the cable 18 further from the rig side of the apparatus 10 until a desired amount of cable 18 is on the drum side of the apparatus 10. The cable 18 can then be reattached to and wound about the drum 14, and the track assembly 60 can remove any additional slack in the cable 18. The clamping assembly 58 is disengaged from the cable 18 when the hydraulic fluid flows back from the clamping actuator 100 through conduit 204 to the reservoir. After the cable management assembly 42 releases the cable 18, the movable housing 22 can be moved allowing the operations to continue.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

Methods of the instant disclosure may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cable shearing apparatus, comprising:
a cable management assembly configured to engage an extended span of a cable, said cable management assembly comprising a continuous track assembly and a clamping assembly positioned on opposing sides of said cable, said track assembly comprising a powered drive chain, said clamping assembly comprising a plurality of unpowered, guide rollers, said cable management assembly further comprising a clamping actuator configured to laterally move said unpowered, guide rollers of said clamping assembly in relation to said powered drive chain of said track assembly, said clamping actuator configured to move said unpowered, guide rollers of said clamping assembly perpendicularly in relation to said span of said cable; and
a cable cutting assembly configured to sever said cable, said cable cutting assembly comprising a cutter arm having a changeable blade body, said cable cutting assembly comprising a cutter actuator engaged with said cutter arm, said cable cutting assembly further comprising an upper support block and a lower support block each having a cutter arm channel, said cutter arm being slidably mounted in said cutter arm channel, said cable cutting assembly further comprising a cutter arm pin guide assembly configured to guide lateral movement of said cutter arm during operation, said cutter arm pin guide assembly comprising a plurality of pins which pass through said upper support block and are received in a pin guide channel of said cutter arm.

2. The apparatus of claim 1 wherein said powered drive chain engaged with drive sprockets, and wherein said track assembly further comprises a motor having a drive shaft engaged with one of said drive sprockets.

3. The apparatus of claim 2 wherein said powered drive chain comprises a double link drive chain having a plurality of blocks having a generally U-shaped channel.

4. The apparatus of claim 3 wherein said blocks are rubber, brass or bronze blocks.

5. The apparatus of claim 2 wherein said track assembly further comprises a chain guide or tensioner.

6. The apparatus of claim 5 wherein said chain guide comprises a pair of parallel guide rails mounted to a chain guide support, and wherein said guide rails engage said powered drive chain.

7. The apparatus of claim 2 wherein said motor is a hydraulically-powered, motor.

8. The apparatus of claim 1 wherein said cable shearing apparatus further comprises at least one cable length gauge in communication with a cable length sensor, and said cable length sensor configured to measure a length of said cable.

9. The apparatus of claim 1 wherein said clamping actuator is a hydraulically-powered, linear actuator.

10. The apparatus of claim 1 wherein said cutter arm comprises a terminal channel for receipt of said blade body.

11. The apparatus of claim 1 wherein a terminal end of said cutter arm channel further comprises a pair of spaced cutter anvil inserts configured to work in conjunction with said blade body to completely sever said cable.

12. The apparatus of claim 1 wherein said cutter arm pin guide assembly comprises a pair of pins that pass through said upper support block and are received in said pin guide channel of said cutter arm.

13. The apparatus of claim 1 wherein said cable cutting assembly further comprises a cover plate attached to said cutter arm, and wherein said cover plate is configured to shield said blade body.

14. The apparatus of claim 1 further comprising a gantry assembly configured to allow for lateral and/or longitudinal movement of said apparatus.

15. The apparatus of claim 1 further comprising a cable brake assembly.

16. The apparatus of claim 15 wherein said cable brake assembly comprises a vise having a handle with movable jaws that are configured to hold said cable.

17. The apparatus of claim 1 further comprising a lower guide roller configured to align and position said cable intermediate of said track assembly and said clamping assembly of said cable management assembly.

* * * * *